METHOD AND APPARATUS FOR DIRECT CONVERSION OF THERMAL ENERGY TO ELECTRICAL ENERGY

Filed Jan. 7, 1966 4 Sheets-Sheet 1

$T_h$ = hot end temperature
$T_c$ = cold end temperature
$P_h$ = high pressure
$P_l$ = low pressure
W = useful work
w = work to pump
$Q_h$ = heat supplied
$Q_c$ = heat rejected

INVENTOR
JOHN C. ANGUS

BY Strauch, Nolan, Neale, Nies & Bronaugh
ATTORNEYS

INVENTOR
JOHN C. ANGUS

BY Strauch, Nolan, Neale, Nies & Bronaugh
ATTORNEYS

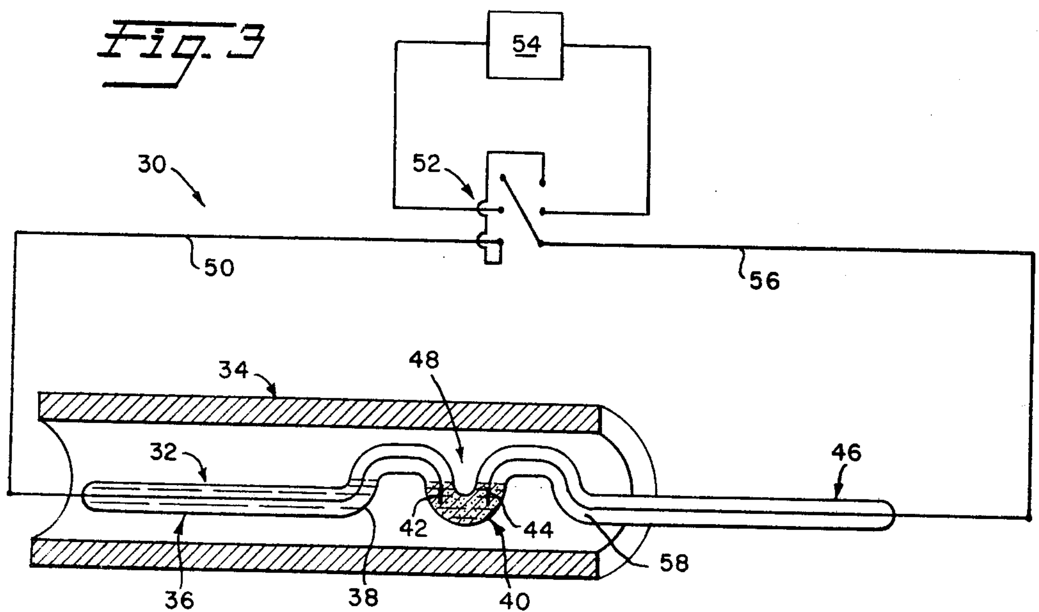
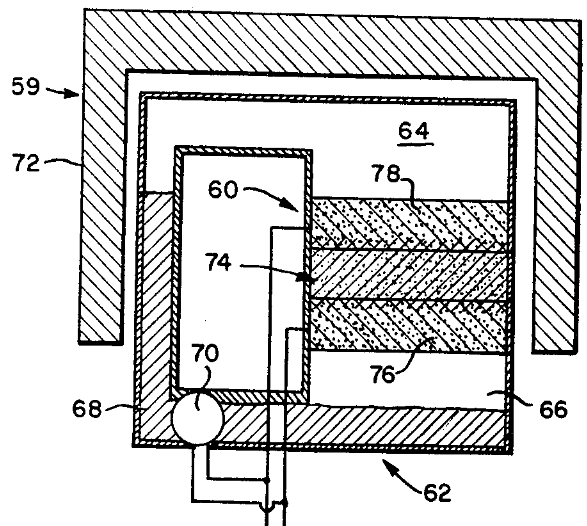
Fig. 4
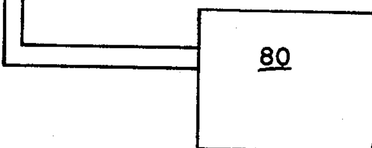
INVENTOR
JOHN C. ANGUS
BY Strauch, Nolan, Neale, Nies & Bronaugh
ATTORNEYS

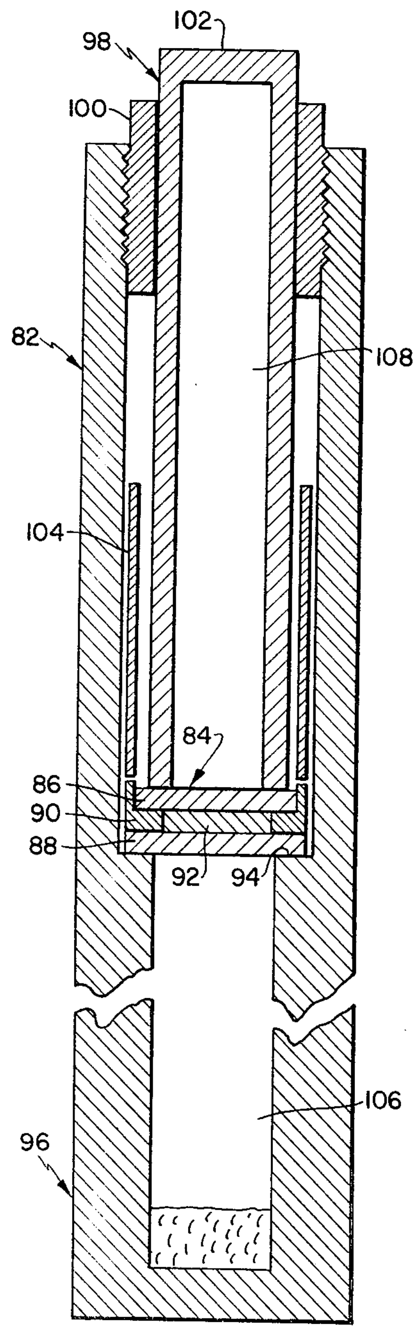
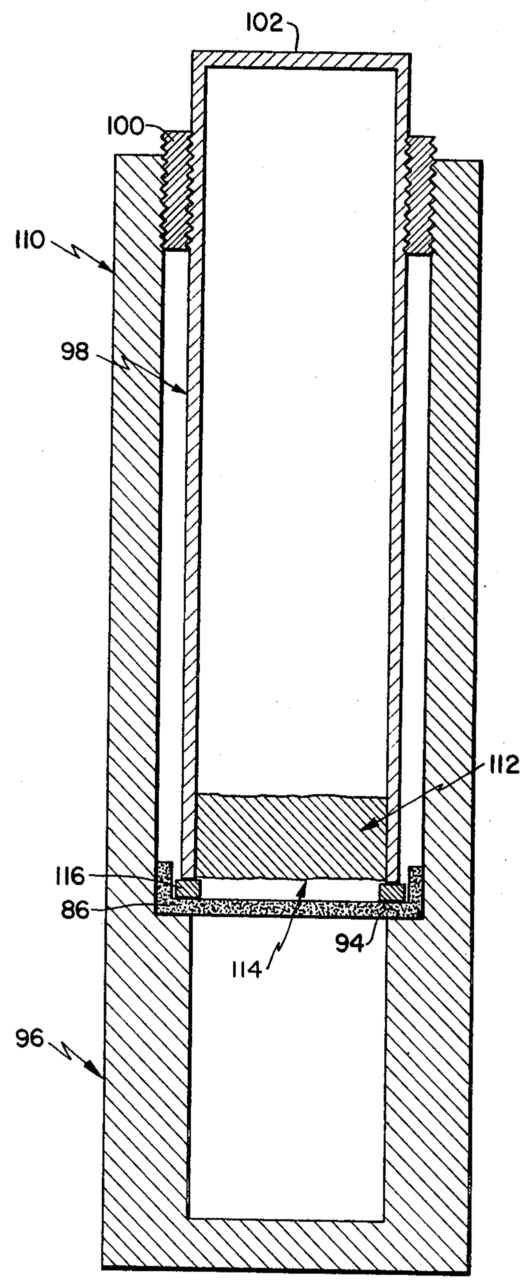
FIG. 5
FIG. 6
INVENTOR
JOHN C. ANGUS
BY
Strauch, Nolan, Neale, Nies & Bronaugh
ATTORNEYS United States Patent Office 3,511,715
Patented May 12, 1970

3,511,715
METHOD AND APPARATUS FOR DIRECT CONVERSION OF THERMAL ENERGY TO ELECTRICAL ENERGY
John C. Angus, Cleveland, Ohio, assignor to Valley Company Incorporated, Atchison, Kans., a corporation of Kansas
Continuation-in-part of application Ser. No. 415,223, Nov. 30, 1964. This application Jan. 7, 1966, Ser. No. 519,365
Int. Cl. H01m 27/00
U.S. Cl. 136—86 28 Claims

ABSTRACT OF THE DISCLOSURE

The direct generation of electricity from thermal energy by isothermally expanding a working substance across an electrolytic cell to develop an electrical potential between the electrodes of the cell.

CROSS REFERENCE TO RELATED APPLICATION

This application is a continuation-in-part of application Ser. No. 415,223, filed Nov. 30, 1964, now abandoned.

This invention relates to the generation of electricity and, more specifically, to the direct conversion of thermal energy into electrical energy.

Numerous devices have heretofore been proposed for converting thermal energy directly into electrical energy. One class is that of the thermoelectric devices which includes thermoelectric generators, thermionic emitters, thermocells, etc. In all thermoelectric devices, there is a temperature gradient across the conducting portion of the device (this gradient is across the legs of the thermocouple in a thermoelectric generator or thermocell and across the narrow gas-filled gap between the cathode and anode of a thermionic emitter). In these prior art devices, therefore, there is inherently a large irreversible flow of thermal energy because the transfer of heat between two bodies at different temperatures—such as between the ends of the legs of a thermocouple or the anode and cathode of a thermionic emitter—is an irreversible process. Principally because of this inherent characteristic of thermoelectric devices, they have very low efficiencies and are useful only in a few specialized applications where efficiency is outweighted by other considerations.

A further disadvantage of thermoelectric generators is that the voltage per couple (or across each anode-cathode) is quite low, an undesirable characteristic which makes these heretofore known direct thermal to electrical energy conversion devices unacceptable for many applications where they could otherwise be advantageously employed.

Another type of prior art device for converting energy directly into electrical energy is the fuel cell. Fuel cells are more efficient than thermoelectric devices but also have serious disadvantages including high production and operation costs and, to date, have not been developed to a point where they are useful for many commercial applications.

In conjunction with the foregoing, fuel cells require special fuels (most successful fuel cells use hydrogen); and the fuel must, moreover, be of extremely high purity. Consequently the fuel for fuel cells is expensive; and the cost of producing electrical energy in fuel cells is high.

The present invention can use any fuel whatsoever that can be burned to produce heat.

Also, in this conjunction, another important advantage of my invention over fuel cells is that my system is chemically closed. That is, a finite amount of working substance is recirculated through the system in contrast to conventional fuel cell systems in which fuel and oxidizer are continuously added. If even the slightest amounts of impurities are present in these materials they will, through the continuous addition of fuel and oxidizer, build up over a long period of time and adversely affect the operation of the cell or render it completely inoperative. A typical example of this is poisoning of the electrodes of a hydrocarbon burning fuel cell by small amounts of sulfur present in the fuel. And, as mentioned in the preceding paragraph, the cost of producing impurity free fuels is very high.

Yet another type of prior art device for converting thermal energy directly into electrical energy is the gas concentration cell disclosed in U.S. Pat. No. 3,186,872 issued June 1, 1965, to Ewing for Continuous Gas Concentration Cell Energy Conversion. One important disadvantage of the Ewing device is that two chemical reactions are involved in the conversion of thermal to electrical energy. The system components required to accommodate these reactions make the Ewing device undesirably complex.

The complexity of the Ewing device is further increased by the necessity of providing for a gas-liquid separation step. Again, such complexity is undesirable in the type of device to which the present invention relates.

A further disadvantage of the Ewing device it its lack of versatility. This arises from the necessity of employing two reagents, one of which must be hydrogen and the other of which must be capable of reversibly combining with hydrogen. Consequently, the usefulness of the Ewing device is severely limited.

The primary object of the present invention resides in the provision of novel improved methods and apparatus for converting thermal energy directly into electrical energy which are free of the above-detailed disadvantages of the prior art direct conversion devices and processes.

Other important specific objects of the present invention include the provision of novel improved methods and apparatus for converting thermal energy directly into electrical energy, which:

(1) are more efficient than thermoelectric devices and comparable in efficiency to fuel cells;
(2) in conjunction with the preceding object, have a negligible irreversible heat flow in comparison to thermoelectric devices;
(3) can develop a higher electrical potential per cell than practical thermoelectric devices heretofore known;
(4) combine high efficiency with simplicity and ease of operation;
(5) can be constructed and operated more inexpensively than prior art devices such as fuel cells;
(6) in conjunction with the preceding objects, do not require special fuels or fuels free of impurities, but can employ thermal energy from substantially any source;
(7) are less complex than previously known gas concentration cells;
(8) in conjunction with the preceding object, do not involve hydrogenation and dehydrogenation chemical reactions as do the previously known gas concentration cells; and
(9) are more versatile than previously known gas concentration cells.

In the novel apparatus and method I have invented, the foregoing and other important advantages are achieved by isothermally expanding a working substance in an electrolytic cell to develop an electric potential between the electrodes of the cell. As this process can be made to be substantially thermodynamically reversible, and since there is little irreversible heat flow, the cell efficiency is limited only by the dictates of the Carnot cycle. Consequently, the direct conversion of thermal to electrical energy can be accomplished much more efficiently in accord with the principles of this invention than it can by thermoelectric generators such as those mentioned above in which there is a large irreversible flow of heat and, therefore, a lower theoretical maximum efficiency than in the present invention. At the same time the apparatus of the present invention is inexpensive and easy to construct and operate unlike fuel cells, the gas cells heretofore known, and other of the prior art devices described above. As far as the previously known gas concentration cells are known, this reduction in complexity arises, in considerable part, from the absence in the present invention of the chemical reactions and gas-liquid separation steps of such previously known cells as discussed above.

A further important advantage of this invention over such previously known cells is that, in contrast to the latter, a wide variety of working fluids can be employed. This makes the present invention much more versatile than such prior art devices.

Another important advantage of the present invention is that it is capable of developing higher cell voltages than prior art direct conversion devices. In fact, it has surprisingly been found that the potential developed in energy conversion cells constructed in accord with the principles of this invention are, in some instances, almost double the voltage predicted by accepted principles of electrochemistry. This is extremely advantageous because electrical energy transmission losses decrease as voltage increases and because electrical devices are for the most part, not designed to operate at the low voltages produced by prior art direct conversion devices. Therefore, in many applications, the present invention eliminates the converters heretofore necessarily employed with direct energy conversion devices to obtain a sufficiently high operating voltage reducing power losses and the complexity of the power supply.

Another important advantage of my invention over prior art devices such as those of the thermoelectric type and fuel cells is that many different sources of thermal energy can be used with the energy conversion devices disclosed herein. The requisite thermal energy may be obtained by the combustion of coal, oil, gas, wood, or other fuels, for example. Or the source of thermal energy may be waste heat from an internal combustion engine or nuclear reactor or another energy conversion device either constructed in accord with the principles of the present invention or of another type. As a further example, the source of thermal energy can be geothermal heat or solar heat. Other suitable sources of thermal energy will be apparent to those skilled in the arts to which this invention pertains.

Further objects, additional features, and other important objects of the present invention will be apparent from the appended claims and as the ensuing detailed description and discussion proceeds in conjunction with the accompanying drawing, in which:

FIG. 3 is a view, similar to FIG. 2, of a second form of energy conversion device constructed in accord with the principles of the present invention and a schematic illustration of the device's external load circuit;

Figure 2:
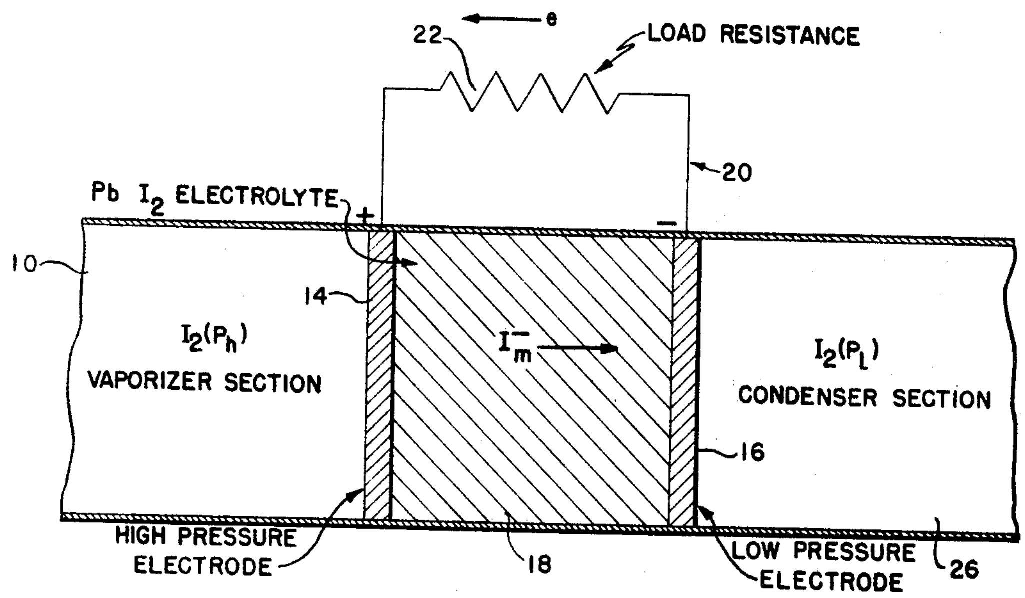
FIG. 2 is a generally diagrammatic section through a vaporizer, electrolytic cell, and condenser of energy conversion apparatus embodying the principles of the present invention.

FIG. 4 is a view, similar to FIG. 2, of a third form of energy conversion device embodying the principles of the present invention; and FIG. 5 is a view, similar to FIG. 2, of a fourth form of energy conversion device embodying the principles of the present invention; and FIG. 6 is a view, similar to FIG. 2, of a modification of the energy conversion device of FIG. 5 which is adapted to operate in an inverted orientation.

Apparatus constructed in accord with the principles of the present invention converts thermal energy directly into electrical energy by expanding a working substance through an isothermal electrolyte which is capable of dissociating the working substance into ions. The chemical potential difference across the cell effects a migration of ions through the electrolyte and the creation of an electrical potential between two electrodes at opposite sides of the body of the electrolyte. Typically, the working substance is iodine ($I_2$) and the electrolyte is lead iodide ($PbI_2$) although the use of this particular working substance-electrolyte combination is not critical in the practice of the present invention.

Figure 1:
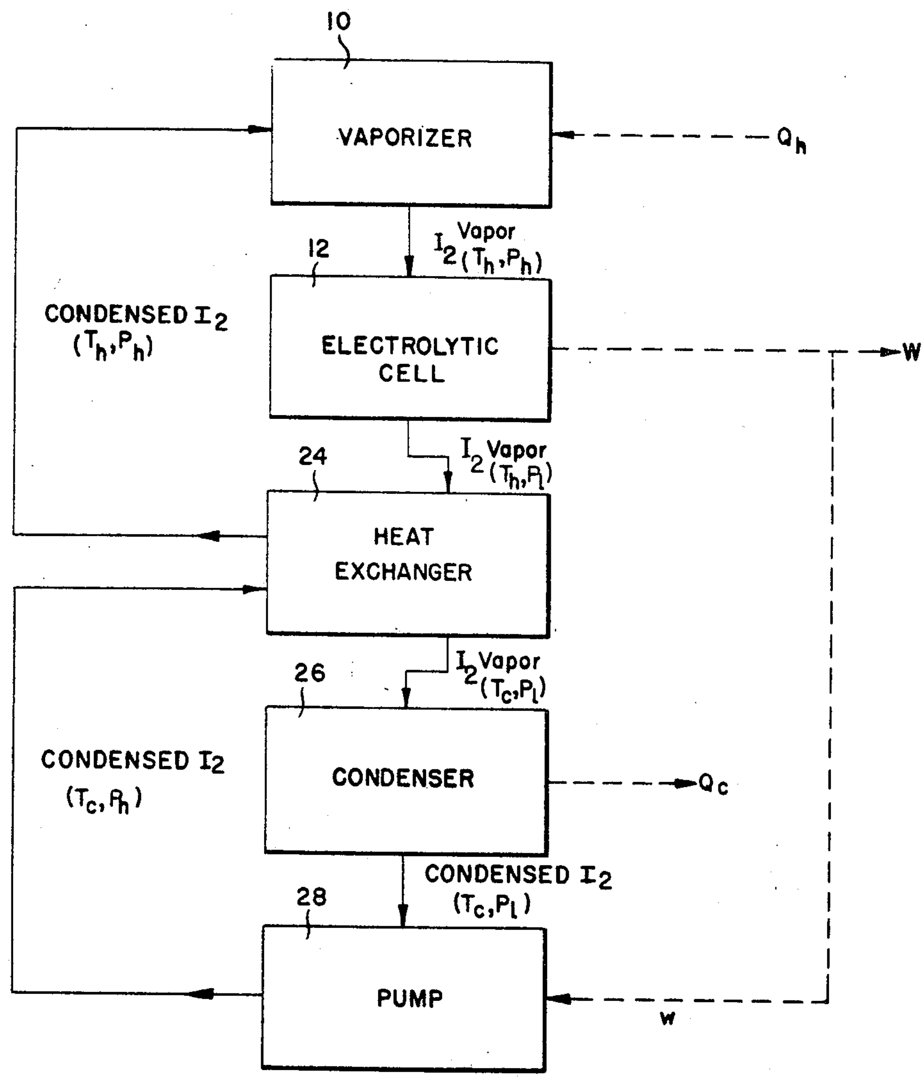
FIG. 1 is a block diagram of the novel apparatus for and process of directly converting thermal to electrical energy provided by the present invention.

Referring now to FIG. 1 of the drawing, in one form of the present invention condensed iodine enters a vaporizer 10 where thermal energy is added to the iodine from an external source such as one of those described above to vaporize the iodine [a portion of this thermal energy ($Q_h$ in FIG. 1) is converted directly to electrical energy by the apparatus of FIG. 1]. Condensed iodine is continuously maintained in vaporizer 10 so that the pressure of the iodine vapor is determined solely by the temperature to which the condensed phase is heated. This is necessary to maintain the high $I_2$ pressure in the vaporizer. It is also important in maintaining a stable output voltage because the voltage is a function solely of the difference in pressure between the high and low pressure iodine (or other working fluid vapor) as can be seen from Equation 1 in col. 6.

From vaporizer 10 the $I_2$ vapor passes to an electrolytic cell 12 which, as shown in FIG. 2, consists of a high pressure electrode 14 and a low pressure electrode 16 between which the body of electrolyte 18 (the $PbI_2$) extends. The iodine dissolves and combines with electrons at electrode 14 (as will become apparent presently, there is a surplusage of free electrons at electrode 14) to form ions. The ions migrate through electrolyte 18 at low pressure electrode 16 where they give up their excess electrons and recombine to form iodine vapor.

The electrons given up at electrode 16 create a potential difference between electrodes 14 and 16 which is capable of causing the electrons to flow from low pressure electrode 16 through an external circuit 20 including a load 22 to high pressure electrode 14, where the electrons are available to combine with the vaporized iodine flowing to electrolytic cell 12 from vaporizer 10.

The migration of electrons through the $PbI_2$ is effected by creating a pressure differential across the body of electrolyte 18. In the embodiment of the present invention illustrated in FIG. 1, this is accoplished by vaporizing the $I_2$ at a high temperature in the vaporizer 10 and by directing the iodine vapor formed at low pressure electrode 16 into a heat exchanger 24 where the iodine vapor is cooled substantially to a temperature $T_C$ and then to a condenser 26 where it is condensed at temperature $T_C$, thereby reducing its vapor pressure. Thus, as shown in FIG. 1, the iodine vapor enters electrolytic cell 12 at a pressure $P_h$, and by cooling the iodine vapor in heat exchanger 24 and condensing it in condenser 26 its vapor pressure is reduced to a lower pressure $P_1$. Therefore, there is an iodine pressure differential (and thus an iodine chemical potential difference) across electrolytic cell 12 of $P_h-P_1$ available to cause transport of the ionized iodine through the cell.

While there is a pressure differential across electrolytic cell 12, the temperature of the iodine vapor formed at low pressure electrode 16 and discharged from cell 12 is maintained substantially the same as the temperature $T_h$ at which the iodine vapor flows into electrolytic cell 12 from vaporizer 10. Therefore, the expansion of the iodine vapors through electrolyte 18 is an isothermal process. This is important in that, in electrolytic cell 12, there is no irreversible heat flow and, accordingly, no reduction in theoretical system efficiency due to this irreversibility.

From heat exchanger 24, the cooled iodine vapor at temperature $T_C$ flows into condenser 26 where the iodine vapor gives up its latent heat of condensation $Q_C$ (which is rejected from the system) and is converted into condensed iodine at temperature $T_C$ and pressure $P_l$. The condensed iodine is circulated by a pump 28, which is operated by a portion of the energy produced in electrolytic cell 12, through heat exchanger 24. In the heat exchanger the condensed iodine is heated substantially to the initial temperature $T_h$ and, at the same time, cools the vaporized iodine from temperature $T_h$ to the lower temperature $T_C$.

From heat exchanger 24 the condensed iodine, now substantially at the initial temperature of $T_h$ and initial pressure of $P_{h'}$, is circulated by pump 28 back into vaporizer 10. Here thermal energy $Q_h$ from an external source is added to convert the condensed iodine to iodine vapor at the initial temperature and presusre $T_h$ and $P_h$. From vaporizer 10 the vapor flows back into electrolytic cell 12. Therefore, the working substance continuously circulates through the apparatus of FIG. 1; and no new supply of working substance is required.

The apparatus of FIG. 1 operates in a manner analogous to a heat engine, absorbing heat at a high temperature from an external source to vaporize the iodine working substance and rejecting a smaller amount of heat at a lower temperature in condenser 26 (the heat rejected from the condenser is equal to the latent heat of condensation of the iodine). Therefore, the maximum efficiency of the apparatus of FIG. 1 is limited by the dictates of the Carnot cycle. The maximum theoretical efficiency of the present invention is much greater than that of prior art thermal energy conversion devices of the types described above in which there is a large irreversible heat flow and, in which, consequently, it is not possible to even theoretically approach Carnot cycle efficiencies.

In an actual operating device of the type just described, Carnot cycle efficiencies are not obtained because of unavoidable irreversible losses from Joulean heating, small irreversible heat flows, overvoltage, etc. However, these losses are small compared to the large irreversible heat flow losses of the prior art devices (in conventional thermoelectric devices, as much as 95% of all entropy production is attributable to irreversible heat flow).

In the present invention, as in the prior art energy conversion devices described above, there is an unavoidable thermal irreversibility in the current carrying leads between the relatively hot electrolyte and the relatively cool load. This irreversibility cannot be eliminated because the thermal conductivity of these conductors cannot be reduced below the value dictated by the Eiedemann-Franz Law.

In addition to having the advantages just discussed, the apparatus of the present invention is extremely simple and employs only the barest minimum of moving parts so that, in addition to being highly efficient, it is simple, inexpensive, and compact. Even further economy, simplicity, and compactness may be obtained, at only a slight sacrifice in efficiency, by the elimination of heat exchanger 24. In this case, condenser 26 performs the function of both the heat exchanger and condenser of the illustrated embodiment in that it both cools and condenses the iodine vapor.

The following examples are of actual energy converting devices constructed and operated in accord with the principles of the present invention.

EXAMPLE 1

A cell with $I_2$ for the working substance, $PbI_2$ for the electrolyte, and with platinum electrodes was run with the following results:

| | | | |
|---|---|---|---|
| Hot end temperature,[1] ° F. | 430 | 445 | 450 |
| Cold end temperature,[1] ° F. | 75 | 75 | 75 |
| Cell voltage (low pressure side is negative) | .46 | .52 | .54 |
| Predicted cell voltage from Equation 1 | .206 | .21 | .212 |

[1] In the examples, the "hot end" temperature is the temperature at which the working substance is vaporized (i.e., the temperature of the external heat source.) The "cold end" temperature is the temperature at which the low pressure vapor is condensed.

This cell was run for over six hours. No corrosion of the electrodes was detectable by electrical measurements or by microscopic examination.

EXAMPLE 2

A cell using $I_2$, $PbI_2$, and nickel electrodes was operated giving the following results:

| | | | | |
|---|---|---|---|---|
| Hot end temperature | 350 | 365 | 375 | 380 |
| Cold end temperature | 75 | 75 | 75 | 75 |
| Cell voltage (low pressure side is negative) | .22 | .24 | .25 | .22 |
| Predicted cell voltage from Equation 1 | .207 | .213 | .218 | .22 |

This cell was run for over ten hours with no measurable deterioration of the output voltage. No evidence of corrosion of the Ni electrode was found. In this cell the electrolyte was operated at 1000° F. so the working substance was heated to 1000° F. after it was vaporized.[1]

EXAMPLE 3

A cell with Hg for the working fluid, a solid $HgCl_2$-$Hg_2Cl_2$ electrolyte, and tungsten electrodes was run with the following results:

| | |
|---|---|
| Hot end temperature, ° F. | 680 |
| Cold end temperature, ° F. | 75 |
| Cell voltage (low pressure side is positive) | 0.7 |

The output voltage of the cells of Examples 1 and 2 would be expected to be that predicted by the familiar equation:

$$E=\frac{RT}{nF}\ln\frac{P_h}{P_l} \quad (1)$$

where E is the voltage, R the gas constant, T the absolute temperature of the cell, $n$ the number of charges transferred per molecule of $I_2$, F is Faraday's constant, $P_h$ is the iodine pressure on the high pressure side of the cell, and $P_l$ the iodine pressure on the low pressure side of the cell.

The predicted cell voltages of Examples 1 and 2 were calculated using $n=2$ in Equation 1. This is consistent with the expected electrode reactions:

$I_2+2e=2I^-$ (high pressure electrode)
$2I^-=I_2+2e$ (low pressure electrode)

However, in both cells, the actual cell voltages materially exceed the predicted voltage. This cannot be explained on the basis of the well known fact that iodine partially dissociates into iodine atoms at moderately high temperatures because this disassociation would not change the predicted cell voltage.

It is believed that this unexpected result can be explained on the following basis: Iodine molecules may form two species of ions, for example $I^-$ and $I_2^-$. For the latter ion species, $n=1$ in Equation 1; and the predicted voltage would be twice that indicated in Examples 1 and 2. It appears that the majority of the iodine molecules form this ionic species in the cell of Example 1 because,

[1] The condensed working substance and vaporized working substance can be heated to different temperatures. As shown by Equation 1, the significant factors in regard to the working substance are the pressures on the high and low pressure sides of the cell.

employing a value of $n=1$, the agreement between the predicted and observed voltages of this cell is better.

More generally, it appears that the iodine vapor may dissolve as an ionic species $I_m^-$, where $m$ is a number between 1 and 2 which is a function of temperature. For Example 1, as indicated above, $m$ is apparently equal to approximately 2.0. In Example 2, the observed and predicted cell voltages indicate that the value of $m$ is about 1.1 to 1.2. The lower value of $m$ for this cell may be due to the fact that the cell of Example 2 was operated at significantly higher electrolyte temperatures (1,000° F. as compared to 350° F. for the cell of FIG. 1).

The importance of high output voltages is discussed above. Because the present invention does produce higher output voltages than prior art direct conversion devices, it represents a substantial advance in the art of converting thermal energy directly to electrical energy.

Referring now to FIG. 2, a typical energy converting unit of the type illustrated in flow chart form in FIG. 1 operates at a temperature between 243 and 770 degrees Fahrenheit and uses iodine as a working substance. The electrolyte 18 is typically a 0.10 inch thick layer of lead iodide, and the high pressure and low pressure electrodes 14 and 16 are nickel, platinum, or carbon. Such a cell will deliver .34 volt under open circuit conditions. Under matched load conditions (i.e., with the load resistance equal to the cell resistance), the current density is .32 ampere per square centimeter of electrolyte area, and the power density is .054 watt per centimeter of electrolyte area. The latter figure is a conservative estimate and, moreover, may be improved considerably simply by employing an electrolyte with a lower resistivity such as lithium iodide or silver iodide and a thinner electrolyte configuration. However, even with the electrolyte material and configuration discussed above, the energy conversion unit just described will convert thermal energy to electrical energy with a theoretical overall efficiency of about 25 percent, a figure which may be significantly increased by changing the electrolyte as described above, and by connecting in the external circuit 20 between electrodes 14 and 16 a load 22 having a resistance higher than the internal resistance of electrolytic cell 12. Also, this figure is for the case where there is no heat exchanger for recovering heat from the low pressure iodine vapor and is, therefore, a conservative value for this further reason.

The details of the vaporizer 10 and the condenser 26 employed in the embodiment of FIG. 2 are not critical; and suitable versions of these components will readily occur to those skilled in the arts to which this invention pertains. Also, suitable exemplary physical arrangements are shown in FIGS. 3 and 4, which illustrate other embodiments of the present invention. Similarly, any suitable type of heat exchanger 24 and pump 28 desired can be employed in this embodiment of the present invention.

As discussed previously, the heat exchanger 24 of the embodiment of the present invention illustrated in FIGS. 1 and 2 may be eliminated with only a small sacrifice in efficiency. It is also possible, both theoretically and as a practical matter, to eliminate from this embodiment of the present invention the pump 28 employed to return the working substance condensed in condenser 26 to vaporizer 10 by alternately effecting a migration of the ionized working substance in opposite directions through the electrolytic cell. An energy conversion device 30, arranged to operate in this manner, is illustrated in FIG. 3.

Turning now to the latter figure, energy conversion device 30 includes a symmetrical elongated sealed tube 32 of a nonporous, heat resistant material such as Pyrex, Vycor glass, or quartz surrounded by a conventional tubular heater 34 which, in this embodiment of the present invention, is the external source supplying the thermal energy for vaporizing the working substance.

In energy conversion device 30, the left-hand end portion 36 of tube 32 contains the condensed working substance which is vaporized in the vaporizer section of the device, identified by reference character 38. The electrolyte 40, through which the vaporized working substnace passes from vaporizer section 38, is disposed in tube 32 adjacent the vaporizer section. In this embodiment of the present invention, the electrodes 42 and 44 are platinum wires which extend from opposite ends of electrolyte body 40 through the sealed ends of tube 32.

It will be remembered that, in apparatus employing the principles of the present invention, the vaporized working substance is condensed after passing through the electrolytic cell. In energy conversion device 30 the condenser for the working substance consists of the right-hand end portion 46 of tube 32.

The operation of this embodiment of the present invention is quite similar to that of the embodiment illustrated in FIG. 1. Specifically, the condensed working substance in the left-hand end 36 of tube 32 is vaporized in vaporizer section 38. The vaporized working substance then flows to the electrolytic cell 48 composed of electrolyte 40 and electrodes 42 and 44, where it is disassociated into ions which migrate through the body of electrolyte 40, creating an electrical potential between electrodes 42 and 44. At electrode 44, the working substance ions reform into working substance vapor which is condensed in condenser section 46 of tube 32 to provide the chemical potential difference (in this case a pressure differential) which effects the migration of the disassociated working substance ions through electrolytic cell 48.

The electrical potential difference between electrodes 42 and 44 is capable of effecting a current flow (in the conventional plus to minus direction) from electrode 42 through external lead 50, reversing switch 52, external load 54, switch 52, and external lead 56 to electrode 44.

After all the working substance in the left-hand end portion 36 of tube 32 has been vaporized, cylindrical tube heater 34 is moved to the right so that it still surrounds the cell 48 but now also surrounds the right-hand end portion 46 of tube 32, which has become filled with the condensed working substance. Thus, the section of tube 32 identified by reference character 58 becomes the vaporizer, and the left-hand end 36 of the tube 32 becomes the condenser; and energy conversion device 30 operates in the manner just described, but in the opposite direction in that the working substance is vaporized in tube section 58, migrates through electrolytic cell 48 from electrode 44 to electrode 42, and is condensed in tube section 36. To maintain the polarity of the voltage applied across the external load 54 the same, reversing switch 52 is thrown at the same time that heater 34 is moved to the right-hand end of tube 32.

From the foregoing, it will be apparent that, by alternately moving heater 34 to the left- and right-hand ends of tube 32 and by reversing switch 52 as the heater is moved, the body of working substance can be alternately expanded in opposite directions across electrolytic cell 48, completely eliminating the need for a pump to circulate the working substance.

With the exception of the differences discussed above, energy conversion device 30 may be of the same construction as the embodiment of the present invention illustrated in FIGS. 1 and 2.

The energy conversion device 59 illustrated in FIG. 4 is, in most respects, similar to those described previously, but employs an improved form of electrolytic cell 60. Referring now to FIG. 4, energy conversion device 59 includes a casing 62 of any suitable material (several were suggested above in conjunction with the description of energy conversion device 30) housing electrolytic cell 60 and forming a vaporizing section 64 and a condenser section 66 on opposite sides of the cell. Condenser section 66 and vaporizer section 64 are connected by a conduit section 68 in which a pump 70 is interposed to circulate the condensed working substance from condenser 66 to vaporizer 64. The upper, vaporizer section 64 of casing 62 is surrounded by a conventional U-sectioned heater 72 for vaporizing the condensed working substance.

The most important feature of this embodiment of the present invention is the configuration of electrolytic cell 60, which is composed of a porous silica matrix 74 separating porous metal electrodes 76 and 78. Matrix 74 and the regions of electrodes 76 and 78 nearest it are impregnated with the electrolyte, the extent of which is indicated by the hatched lines in FIG. 4.

This electrode configuration has several advantages over those described prveiously. First, the porous metal electrodes provide a larger area for the electrode reaction between the vaporized working fluid and the electrolyte, which reduces overvoltage losses at the electrodes. Second, the use of a porous matrix permits large pressure differences to be maintained across the electrolytic cell when a liquid electrolyte is employed since the electrolyte is retained in the pores of the matrix and the electrodes by surface tension so there is no problem with leakage.

The operation of energy conversion device 59 is substantially identical to the operation of the embodiments of the present invention illustrated in FIGS. 1 and 2, the working substance being vaporized in vaporizer section 64 and then flowing to electrolytic cell 60 where it is disassociated into ions. The ions migrate across cell 60 to electrode 76, where the vapor is reformed, creating an electrical potential across electrodes 76 and 78. The relatively low pressure working substance vapor then flows into condenser section 66 where it is condensed and pumped back to vaporizer section 64 by pump 70.

The electrodes 78 and 76 are connected to an external load 80 and to the motor of the working substance circulating pump 70.

Typical results obtainable from apparatus of the type just described are illustrated by the following example:

EXAMPLE 4

A cell with $I_2$ for the working substance and liquid $PbI_2$ for the electrolyte was run. The electrolyte was impregnated in a porous ceramic matrix as shown in FIG. 4. Two porous Ni electrodes were used, one on either side of the electrolyte. The electrodes were partially impregnated with the electrolyte as described above and illustrated in FIG. 4.

The following results were obtained:

| | | |
|---|---|---|
| Hot end temperature | ° F. | 360 |
| Cold end temperature | ° F. | 75 |
| Cell voltage (low pressure side is negative) | v. | .45 |

Although the form of my invention just described includes only one electrolytic cell 60 as illustrated in FIG. 4 it is to be understood that, to obtain greater currents or higher voltages, many such cells can be employed in an energy conversion device having a single circulating pump and a single source of external heat. Depending upon the requirements of the external load, these cells may be electrically connected in series or in parallel.

The electrolytic cell 82 illustrated in FIG. 5 is particularly advantageous in that internal resistance is lower than in the embodiments of the present invention described previously. Cell 82 includes an electrode assembly 84 consisting of two porous nickel electrodes 86 and 88 maintained in parallel spaced relationship by an annular boron nitride separator ring 90. The space or chamber 92 defined by the two electrodes and the separator ring is filled with electrolyte.

Electrode assembly 84 is seated on a ledge 94 in a graphite cylinder or sleeve 96 which is closed at one end and open at the other. The assembly is retained in place by a second graphite cylinder or sleeve 98 fixed as with an epoxy seal to a boron nitride sleeve 100 threaded into the open end of sleeve 96, which is closed by the sleeve and the closed end 102 of the inner sleeve 98.

A tubular quartz insulator 104 is mounted in the annular space between the concentric graphite cylinders 96 and 98.

Cell 82 operates in substantially the same manner as those described previously. Working fluid in the chamber 106 defined by outer cylinder 96 and high pressure electrode 88 is vaporized by the application of thermal energy. The vapor combines with electrons at high pressure electrode 88, forming ions which migrate through the electrode and the electrolyte in chamber 92 to low pressure electrode 86 where the electrons are given up and the ions recombined to reform the working fluid.

The electrons given up at electrode 86 create a potential difference between electrodes 86 and 88 which is capable of causing the electrons to flow from electrode 86 through an external load circuit to electrode 88 where the lectrons are available to combine with the vaporized working fluid flowing to electrode 88 from chamber 106. Cylinders 96 and 98 act as leads from electrodes 88 and 86, respectively, to the external load circuit. Separator ring 90 and sleeve 100 electrically isolate the two cylinders.

The following example illustrates the results obtainable in a cell of the type illustrated in FIG. 5.

EXAMPLE 5

A cell of the type shown in FIG. 5 with $I_2$ for the working fluid and $PbI_2$ for the electrolyte was run with the following results:

| | |
|---|---|
| Hot end temperature, ° F. | 780 |
| Cold end temperature, ° F. | 200 |
| Cell voltage (low pressure side is negative) | 0.17 |
| Cell current, milliamperes | 6.2 |

In this example, the full vapor pressure of $I_2$ was not used. The amount of $I_2$ placed in the high pressure chamber 106 was small enough so it completely vaporized. Consequently, the pressure differential and thus the voltage across the cell are lower than they would be if the full vapor pressure of the iodine were used.

Although it is not shown, it is to be understood that cell 82 can be provided with an external fluid circuit for returning the working fluid in the low pressure chamber 108 defined by inner cylinder 98 and electrode 86 to high pressure chamber 106.

FIG. 6 illustrates an electrolytic cell 110, which is a modification of the cell 82 just described and is designed to operate in a position which is inverted with respect to that in which the latter cell is intended to run. In cell 110, the high pressure electrode 88 of cell 82 is omitted, and the working fluid 112 rests directly upon the electrolyte 114. Also, separator ring 90 is replaced with a ring 116 which, together with sleeve 100, electrically isolates the two current carrying sleeves 96 and 98 from each other. The operation of cell 110 is substantially the same as that of cell 82.

As mentioned above, cell 110 is intended to operate in a position which is inverted relative to that for which cell 82 is designed. Cell 110 also has the advantage over cell 82 that convection heat losses are lower.

The electrolytic cell of energy converting units produced in accord with the principles of the present invention may employ either liquid or solid electrolytes. Liquid electrolytes have the advantage over solid electrolytes of lower resistance; but solid electrolytes, in turn, have the advantage over liquid electrolytes that they are more easily contained. Also, as suggested briefly above, many working substance-electrolyte combinations can be utilized in energy converting units in accord with the principles of this invention. For example $Br_2$-$PbBr_2$ and $Cl_2$-$PbCl_2$ systems are examples of working substance-electrolyte combinations that can be utilized in the present invention. In addition, a working substance that dissolves as a cation can be utilized. A system employing a working substance of this type is, for example, the Hg-$Ag_2HgI_4$ combination. A cationic working substance has the advantage over an anionic working substance such as iodine, bromine, or chlorine that cationic conductivity in most electrolytes is higher than anionic conductivity. Two very favorable cationic working fluid-electrolyte combinations are the Na-NaCl system and the K-KCl system.

Substantially the only limitations on the working substance are that it must condense and must have a vaporization temperature low enough that it can be vaporized by the heat from the available external sources. The electrolyte must be an ionic conductor and must contain mobile ionic species made up at least in part by the elements of the working substance—for example, $I^-$ for a working fluid of $I_2$, $Hg^+$ for a working substance of Hg, $ZnCl_3^-$ for a working substance of $Cl_2$, and $Na^+$ for a working fluid of Na. The electrolyte need not be a pure salt. For example, a solution of salts may be employed if a lower melting point is desired.

Desirable but not essential characteristics of the working substance are: (a) non-corrosive properties; (b) that it not have an excessively high vapor pressure for the operating temperatures to be utilized; (c) high heat of vaporization, which results in a large pressure ratio and hence a high cell voltage for a given temperature differential; and (d) a high surface tension. It is also desirable but not essential that the electrolyte have negligible vapor pressure and high mobility of the ionic species which transport the working substance.

In addition to the working substance-electrolyte systems specifically mentioned above, the following are satisfactory.

| Working substance: | Electrolyte |
|---|---|
| $I_2$ | LiI (liquid). |
| $S_2$ | Sulfide glasses. |

However, it will be apparent from the foregoing that numerous other combinations of working substance and electrolytes can be used in the practice of the present invention. Many such combinations will readily occur to those skilled in the art to which this invention pertains; and, therefore, the foregoing discussion of particular combinations is not intended to be limiting but is merely to illustrate the principles of this invention, which is intended to encompass apparatus and methods employing all such systems, except as specifically excluded from the appended claims.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In the generation of electricity by the direct conversion of thermal energy to electrical energy, the steps of:
(a) vaporizing a working substance at a relatively high initial pressure on one side of an isothemal electrolytic cell embodying an electrolyte capable of dissassociating said vapors working substance into ions; and
(b) creating a pressure differential across said isothermal cell by physically condensing said substance on the opposite side thereof to thereby effect a migration of said ions across said cell and tthe creation of an electrical potential between two electrodes at the opposite sides thereof.

2. The method of claim 1, wherein the working substance is a halogen and the electrolyte is a salt of the halide.

3. The method of claim 1, wherein the electrolyte is solid.

4. The method of claim 1, wherein the electrolyte is liquid.

5. The method of claim 1, whreein the electrodes are of a metal selected from the group consisting of platinum and nickel.

6. The method of claim 1, together with the steps of:
(a) after substantially all of said working substance has been transported across said cell and condensed, vaporizing the condensed working substance at a relatively high pressure and condensing said working substance on the original side of said cell in order to reverse the direction of migration of ions;
(b) connecting an external load across said electrodes; and
(c) electrically reversing the connections between said electrodes concurrently with the reversal of the direction of movement of said ions through said electrolyte to thereby maintain the polarity of the electrical potential across said load in the same direction; and
(d) continuing this cycle operation to maintain the continuous production of electrical energy.

7. The method of claim 1, together with the step of employing a portion of the energy output of said cell to increase the pressure of said condensed working substance to said initial pressure, whereby said working substance may be recirculated through said cell.

8. The method of claim 7, together with the steps of:
(a) adding thermal energy from the vaporized working substance discharged from said cell to said condnesed working substance to increase the temperature of said substance;
(b) adding sufficient energy to said substance from an external source to convert it to a vapor at said initial temperature and pressure; and
(c) recirculating said vapor into the electrolytic cell.

9. The method of claim 1, together with the step of extracting thermal energy from the vaporous working substance discharged from said cell until it is condensed to thereby lower the temperature and vapor pressure of said working substance.

10. The method of claim 9, together with the steps of:
(a) adding to the condensed working substance enough thermal energy to re-vaporize said condensed phase;
(b) creating a pressure differential across said cell in the opposite direction to that previously obtained to effect a migration of said ions through said cell in a direction opposite to that previously obtained and thereby effect an electrical potential difference in a direction opposite to that previously obtained, said pressure differential being created by:
(c) extracting thermal energy from the re-vaporized working substance and condensing said working substance in the chamber wherein it was originally vaporized; and
(d) continuing this cyclic operation to maintain the continuous production of electrical energy.

11. The method of claim 1, together with the steps of:
(a) connecting an external load containing circuit across said electrodes;
(b) reversing said pressure differential to reverse the direction of migration of said ions; and
(c) electrically reversing the connections between said electrodes and said load concurrently with the reversal of the direction of movement of said ions through said electrolyte to thereby maintain the polarity of the electrical potential across said load in the same direction.

12. In the generation of electricity by the direct conversion of thermal energy to electrical energy, the steps of:

(a) alternately adding sufficient energy to a condensed fluid phase to convert said condensed phase to the vapor phase and extracting thermal energy from said fluid to convert it to the condensed phase; and (b) converting a large portion of the difference between the energy added to and extracted from said fluid to electrical energy by isothermally expanding the vapor through an electrolyte capable of disassociating said vapor into ions to thereby create an electrical potential capable of causing the flow of electrical current in an external circuit across electrodes at the opposite sides of said electrolyte.

13. The method of claim 12, together with the steps of.

(a) adding to the phase just condensed enough thermal energy to re-vaporize said condensed phase;

(b) expanding said re-vaporized condensed phase through said electrolyte in a reverse direction back to where it was originally vaporized, thereby causing an electrical potential difference in the opposite direction to that previously obtained; and (c) continuing this cyclic operation to maintain the continuous production of electrical energy.

14. The method of claim 12, together with the steps of:

(a) utilizing a portion of the electrical energy produced as aforesaid to increase the pressure on said condensed phase to the initial pressure;

(b) adding to said condensed phase the thermal energy extracted from the vapor to increase the temperature of said phase substantially to said initial temperature;

(c) adding sufficient thermal energy to said condensed phase at said initial temperature and pressure from an external source to convert it to a vapour; and (d) re-expanding said vapor through an electrolyte as aforesaid.

15. Apparatus for generating electricity by the direct conversion of thermal energy to electrical energy, comprising:

(a) a body of electrolyte capable of disassociating a selected working substance into ions;

(b) electrodes at the opposite sides of said body of electrolyte;

(c) means for vaporizing the working substance and introducing said vaporized working substance into said body of electrolyte at one side thereof;

(d) means for creating a pressure differential across the body of electrolyte by physically condensing said working substance on the opposite side of said body of electrolyte to effect a migration of said working substances ions from one to the other of said electrodes and the creation of an electrical potential therebetween; and (e) means for maintaining said electrodes at substantially the same temperature so that there is no significant temperature differential across the body of electrolyte, whereby the process is substantially thermodynamically reversible and energy losses due to the irreversible flow of thermal energy are accordingly virtually eliminated.

16. The apparatus of claim 15, wheren the pressure differential creating means comprises a vaporizing chamber in fluid communication with the body of electrolyte in which said working substance is vaporized and a condenser in fluid communication with the body of electrolyte adapted to have vaporized working substance and a cooling medium circulated therethrough in heat transfer relationship.

17. Apparatus according to claim 16, together with:

(a) a heat exchanger;

(b) means for circulating vapourized working substance from said body of electrolyte through said heat exchanger before it reaches said condenser;

(c) means for circulating the condensed working substance through said heat exchanger to cool the vaporous working fluid passing therethrough; and (d) wherein said vaporizing chamber is in fluid communication with an between said heat exchanger and said body of electrolyte and said vaporizing means includes means for adding thermal energy to the condensed working substance circulated to said chamber.

18. The apparatus of claim 15, wherein the working substance is a halogen and the electrolyte is a halide of said halogen.

19. The apparatus of claim 15, wherein the electrolyte is solid.

20. The apparatus of claim 15, wherein the electrolyte is liquid.

21. The apparatus of claim 15, wherein the electrodes comprise a metal selected from the group consisting of platinum and nickel.

22. The apparatus of claim 15, together with a porous matrix, said electrodes being at opposite sides of said matrix and said electrolyte being impregnated in said matrix and in the portions of said electrodes nearest said matrix.

23. The apparatus of claim 15, wherein said electrodes and said body of electrolyte constitute an electrolyte cell and wherein said electrolytic cell is symmetrical, whereby continuous operation may be maintained by reversing the direction of the migration of said ions through said cell.

24. The apparatus of claim 16, wherein said vaporizing chamber and condenser are substantially identical in construction and symmetrically disposed about a symmetrical electrolytic cell, whereby continuous operation may be maintained by reversing the migration direction of the ions by alternately operating each side of the cell as a vaporizing chamber or a condenser.

25. The method of claim 1, wherein the working substance is a metal and the electrolyte is a salt of the metal.

26. The method of claim 25, wherein the working substance is selected from the group consisting of mercury, sodium, and potassium and the electrolyte is a halide.

27. The apparatus of claim 15, wherein the working substance is a metal and the electrolyte is a salt of the metal.

28. The apparatus of claim 27, wherein the working substance is selected from the group consisting of mercury, sodium, and potassium and the electrolyte is a halide.

References Cited

UNITED STATES PATENTS

| | | | |
|---|---|---|---|
| 2,890,259 | 6/1959 | Weininger | 136—86 |
| 2,901,524 | 8/1959 | Gorin et al. | 136—86 |
| 3,293,079 | 12/1966 | Brodd | 136—86 |
| 3,294,585 | 12/1966 | Senderoff | 136—86 |
| 3,400,054 | 9/1968 | Ruka et al. | 136—86 X |

FOREIGN PATENTS

| | | |
|---|---|---|
| 685,755 | 5/1964 | Canada. |

ALLEN B. CURTIS, Primary Examiner